(12) United States Patent
Stecher (10) Patent No.: US 8,490,167 B2
(45) Date of Patent: Jul. 16, 2013

(54) PREVENTING PASSWORD PRESENTATION BY A COMPUTER SYSTEM

(75) Inventor: David M. Stecher, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 54 days.

(21) Appl. No.: 13/117,376

(22) Filed: May 27, 2011

(65) Prior Publication Data

US 2012/0304302 A1 Nov. 29, 2012

(51) Int. Cl.
*H04L 9/32* (2006.01)
*G06F 21/00* (2006.01)

(52) U.S. Cl.
USPC .................................................. 726/7; 726/19

(58) Field of Classification Search
None
See application file for complete search history.

(56) References Cited

U.S. PATENT DOCUMENTS

| | | | | |
|---|---|---|---|---|
| 6,151,593 | A * | 11/2000 | Cho et al. .......................... | 706/16 |
| 7,386,731 | B2 * | 6/2008 | Sanai et al. ..................... | 713/183 |
| 7,516,479 | B2 * | 4/2009 | Kurita ............................... | 726/2 |
| 7,788,498 | B2 * | 8/2010 | Yang et al. ...................... | 713/183 |
| 7,921,454 | B2 * | 4/2011 | Cerruti et al. ...................... | 726/5 |
| 8,006,096 | B2 * | 8/2011 | Oda ................................. | 713/183 |
| 2007/0027879 | A1 * | 2/2007 | Bridges et al. ................. | 707/100 |
| 2007/0027894 | A1 * | 2/2007 | Bridges et al. ................. | 707/102 |
| 2007/0027895 | A1 * | 2/2007 | Bridges et al. ................. | 707/102 |
| 2007/0033647 | A1 * | 2/2007 | Yang et al. ....................... | 726/18 |
| 2008/0072302 | A1 | 3/2008 | Parkinson | |
| 2008/0172715 | A1 * | 7/2008 | Geiger et al. ...................... | 726/1 |
| 2008/0270848 | A1 * | 10/2008 | Connally et al. ................ | 714/46 |
| 2009/0259588 | A1 * | 10/2009 | Lindsay .......................... | 705/40 |
| 2010/0011439 | A1 * | 1/2010 | Takiyama ........................ | 726/19 |
| 2010/0058460 | A1 * | 3/2010 | Kaiser et al. ..................... | 726/16 |
| 2010/0218244 | A1 | 8/2010 | Smelyansky | |
| 2011/0065497 | A1 * | 3/2011 | Patterson, Jr. ................... | 463/25 |
| 2011/0072511 | A1 * | 3/2011 | Gillespie ......................... | 726/19 |
| 2011/0105086 | A1 * | 5/2011 | Kurita ........................... | 455/411 |
| 2012/0113456 | A1 * | 5/2012 | Kadoda ........................ | 358/1.14 |

FOREIGN PATENT DOCUMENTS

JP 2008-217669 * 9/2008

OTHER PUBLICATIONS

Machine Translation of JP 2008-217669 published on Sep. 18, 2008, p. 1-20.*
Furioustee's Q&A, published on the World Wide Web at http://www.furioustees.com/I_type_the_first_letter_of_my_username_on_facebook_my_password_shows_up-qna99334.html.
Furioustee's Q&A, published on the World Wide Web at http://www.furioustees.com/categorydetail.php?cmd=search&q=I type the first letter of my username on facebook my password shows up.
Gustafson et al, "Securely Available Credentials (SACRED)—Credential Server Framework", Memo, Apr. 2004, RFC3760, Network Working Group.

(Continued)

*Primary Examiner* — Christopher Revak
(74) *Attorney, Agent, or Firm* — Paul S. Drake (57) ABSTRACT

A method, system or computer usable program product for preventing a password from being presented in a data entry field on a computer display including, responsive to user entry of a character set in the data entry field, comparing the character set to a securely stored password set for a potential match of the character set with leading characters of a password in the password set, responsive to detecting a match, inhibiting presentation of at least one character of the character set in the data entry field, and responsive to detecting a lack of a match, presenting the character set in the data entry field.

20 Claims, 6 Drawing Sheets

OTHER PUBLICATIONS

Jakobsson et al, "Delayed Password Disclosure", Int. J. Applied Cryptography, 2008, pp. 47-59, vol. 1, No. 1.

Waters, "Information Escapology", posted in General Security, Information Leaks, Wirewatcher, Oct. 16 2009, at http://wirewatcher.wordpress.com/category/information-leaks/.

* cited by examiner

PREVENTING PASSWORD PRESENTATION BY A COMPUTER SYSTEM

BACKGROUND

1. Technical Field

The present invention relates generally to managing password security for a computer system, and in particular, to a computer implemented method for preventing password presentation by a computer system.

2. Description of Related Art

Passwords are an intrinsic part of functioning within a computerized society. Computer systems often require that a user is authenticated or verified before the user is granted initial or continuing access. Often this authentication or verification is accomplished by requiring the user to enter a username and a password, each composed of a string of characters, known to both the computer system and the user.

Computer systems requiring authentication or verification may be computer devices and/or computer software applications. A computer device requiring a password may be a server, desktop computer, laptop, mobile phone, smart phone, or other type of stationary, portable or mobile device. A computer software application requiring a password for access may be an operating system, browser, website, software program, or other type of software such as a smart phone application.

Often a password is not displayed when it is being typed to prevent others in the vicinity from viewing that password, thereby maintaining the confidentiality of the password. Instead of displaying the password, often a dot, asterisk, or other character may be displayed in the password field as the password is being typed. Because the username may be less secure and to allow the user to verify what he or she is typing, the username may be displayed when being typed. However, if the user accidentally types their password in a displayed username field, then the password will be displayed and may be viewed by anyone within eyeshot of the user's display.

Some software applications and browsers utilize an autocomplete feature for providing and displaying previously submitted text in data entry fields such as the username field. However, if a user previously typed a password in the username field, then the password may be displayed by the autocomplete feature. For example, if the user types their username, fails to press the tab key, and types their password, then the password will be displayed alongside their username. In addition, with the autocomplete feature enabled, that combination may be displayed every time the user starts to type their username in the username field.

SUMMARY

The illustrative embodiments provide a method, system, and computer usable program product for preventing a password from being presented in a data entry field on a computer display including, responsive to user entry of a character set in the data entry field, comparing the character set to a securely stored password set for a potential match of the character set with leading characters of a password in the password set, responsive to detecting a match, inhibiting presentation of at least one character of the character set in the data entry field, and responsive to detecting a lack of a match, presenting the character set in the data entry field.

BRIEF DESCRIPTION OF THE SEVERAL VIEWS OF THE DRAWINGS

The novel features believed characteristic of the invention are set forth in the appended claims. The invention itself, further objectives and advantages thereof, as well as a preferred mode of use, will best be understood by reference to the following detailed description of illustrative embodiments when read in conjunction with the accompanying drawings, wherein:

DETAILED DESCRIPTION

Steps may be taken to prevent the display or presentation of a password, even if the password is typed outside the password field. These steps may be taken as will be explained with reference to the various embodiments below.

Figure 1:
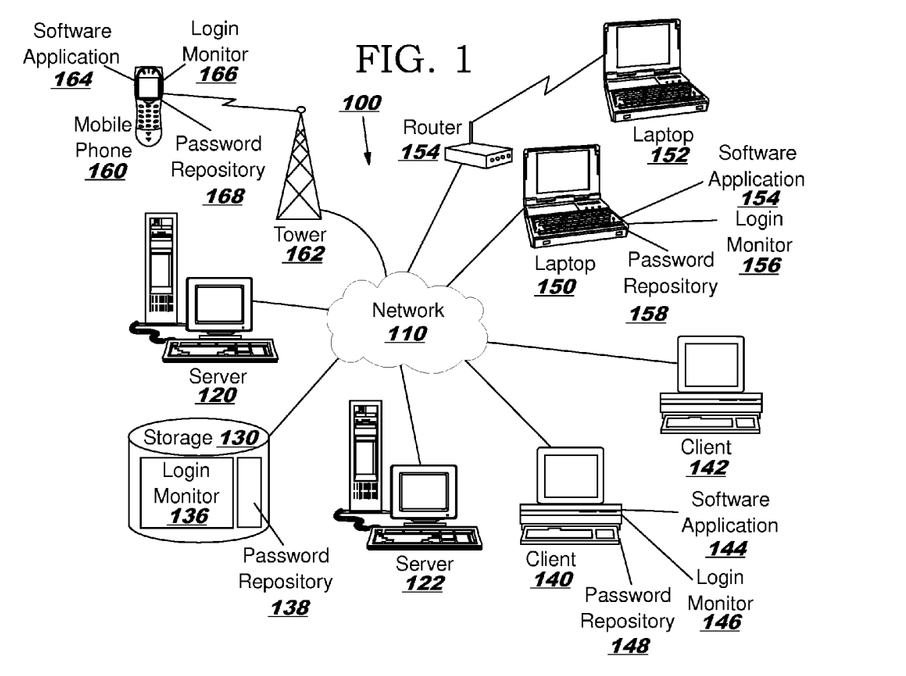
FIG. 1 depicts a block diagram of a network of data processing systems in which various embodiments may be implemented.

FIG. 1 depicts a pictorial representation of a network of data processing systems in which various embodiments may be implemented. Data processing environment 100 is a network of data processing systems also known as computers or computer devices in which the embodiments may be implemented. Software applications may execute on any computer or other type of data processing system in data processing environment 100. Data processing environment 100 includes network 110. Network 110 is the medium used to provide communications links between various devices and computers connected together within data processing environment 100. Network 110 may include connections such as wire, wireless communication links, or fiber optic cables.

Servers 120 and 122 and clients 140 and 142 are coupled to network 110 along with storage unit 130. In addition, laptops 150 and 152 are coupled to network 110 including wirelessly through a network router 154. A mobile phone 160 is also coupled to network 110 through a mobile phone tower 162. Data processing systems, such as server 120 and 122, client 140 and 142, laptops 150 and 152, and mobile phone 160, may contain data and may have software applications including software tools executing thereon. Other types of data processing systems such as personal digital assistants (PDAs), smartphones, tablets and netbooks may be coupled to network 110.

Storage 130 may include login monitor 136 and password repository 138 for managing password security for the various computer devices or software applications in accordance with embodiments described herein. Client 140 may include software application 144, login monitor 146 and password repository 148. Laptop 150 and mobile phone 160 may also include software applications 154 and 164, login monitors 156 and 166, and password repositories 158 and 168. Other types of data processing systems coupled to network 110 may also include software applications and security utilities. Software applications could include a web browser, email, or other software application that can process a web page, email, or other type of information to be processed.

Servers 120 and 122, storage unit 130, clients 140 and 142, laptops 150 and 152, and mobile phone 160 and other data processing devices may couple to network 102 using wired connections, wireless communication protocols, or other suitable data connectivity. Clients 140 and 142 may be, for example, personal computers or network computers.

In the depicted example, server 120 may provide data, such as boot files, operating system images, and applications to clients 140 and 142 and laptop 150. Clients 140 and 142 and laptop 150 may be clients to server 120 in this example. Clients 140 and 142, laptops 150 and 152, mobile phone 160, or some combination thereof, may include their own data, boot files, operating system images, and applications. Data processing environment 100 may include additional servers, clients, and other devices that are not shown.

In the depicted example, data processing environment 100 may be the Internet. Network 110 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client server environment in which the embodiments may be implemented. A client server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

Figure 2:
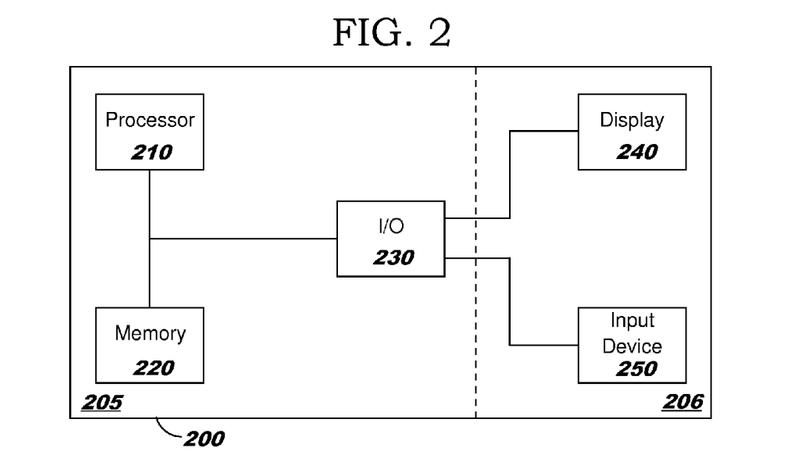
FIG. 2 depicts a block diagram of a data processing system in which various embodiments may be implemented.

FIG. 2 depicts a block diagram of a data processing system in which various embodiments may be implemented. Data processing system 200 is an example of a computer device, such as server 120, client 140, laptop 150 or mobile phone 160 in FIG. 1, in which computer usable program code or instructions implementing the processes may be located for the illustrative embodiments.

In the depicted example, data processing system 200 includes a CPU or central processing unit 210 which may contain one or more processors and may be implemented using one or more heterogeneous processor systems including a graphics processor. The depicted example also includes a memory 220 which may be used for storing instructions and data to be processed by CPU 210. Memory 220 may include a main memory composed of random access memory (RAM), read only memory (ROM), or other types of storage devices. Memory 210 could also include secondary storage devices such as a hard disk drive, DVD drive or other devices which may be internal or external to data processing system 200. An input output device (I/O) 230 is also shown in the depicted example for managing communications with various input devices and output devices. However, other examples could use the CPU to communicate directly with various input or output devices or use separate input and output controllers.

In the depicted example, a computer display 240 is shown for the data processing system to communicate with a user or another data processing system. Other types of output devices may be used such as an audio device. An input device 250 is also shown which may be a keyboard, mouse, a touch sensitive display, or other types of input devices.

Data processing system 200 is shown with an internal section 205 and an external section 206. Often input and output devices may be physically separate from but connected to the CPU and memory. However, that is often not the case with portable devices such as mobile phones.

An operating system may run on processor 210. The operating system coordinates and provides control of various components within data processing system 200 in FIG. 2. The operating system may be a commercially available operating system. An object oriented programming system may run in conjunction with the operating system and provides calls to the operating system from programs or applications executing on data processing system 200. Instructions for the operating system, the object-oriented programming system, and applications or programs may be located on secondary storage devices such a hard drive, and may be loaded into RAM for execution by processing unit 210.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1 and 2. In addition, the processes of the embodiments may be applied to a multiprocessor data processing system.

The depicted examples in FIGS. 1-2 and above-described examples are not meant to imply architectural limitations. For example, data processing system 200 may also be a mobile phone 160, tablet computer, laptop computer, or telephone device.

Figure 3:
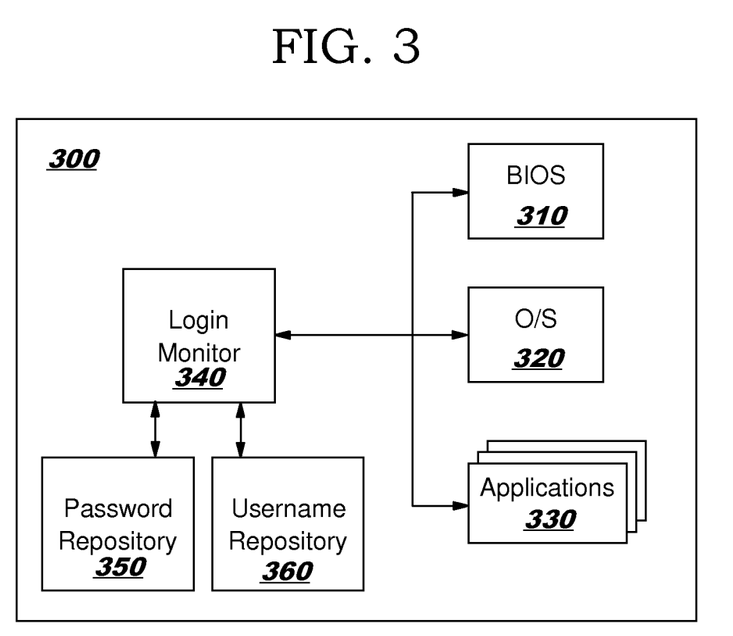
FIG. 3 depicts a block diagram of software and data stored in a data processing system memory in which various embodiments may be implemented.

FIG. 3 depicts a block diagram of software and data stored in a data processing system memory in which various embodiments may be implemented. In a data processing system memory 300, various software applications may be used by the data processing system for initializing (booting) and running the data processing system. These software programs may be located in the local memory of the data processing system or in the memory of other connected data processing systems such as memory storage of a server.

A BIOS 310 may be used for initializing the data processing system and for various base functions. BIOS (basic input/output system is typically stored in a local non-volatile memory such as ROM or flash memory on a data processing system motherboard. An operating system (O/S) 320 is used for managing the various computer hardware resources and provides common services for efficient execution of application software. Software applications 330 may be used to perform singular or multiple related specific tasks or functions. An example of a software application would be an internet browser, spreadsheet program, email application, video game, or other function.

Login monitor 340 may be used to manage password entry for the data processing system in accordance with the various embodiments described below. Login monitor may be called or invoked by each of the types of software shown herein. That is, BIOS 310 may invoke login monitor 340 during system initialization. O/S 320 may invoke login monitor 340 upon certain conditions such as when the system is turned on (after BIOS has initialized the system) or when the user attempts to start any application. Any application 330 may also invoke login monitor 340 such as when the application is first started by the user. Login monitor may also be incorporated in any of the software used by the data processing system. For example, login monitor 340 could be included as part of BIOS 310, O/S 320, or any application 330.

Login monitor 340 may utilize a password repository 350 stored in memory. A password repository may be created by a software application, such as an internet browser, or it may be system wide across multiple software applications. For example, a software application such as an internet browser may utilize a password repository for storing any passwords utilized by that internet browser. This could include passwords for various internet sites that a user may access using the internet browser such as a social networking site, an on-line banking site, a travel planning site, or any other site that may utilize a password. In addition, modern operating systems contain a password repository or vault which allows for the secure storage of a large number of passwords for a large number of applications and may be unlocked using one master password. Password repository 350 may be managed by an operating system and utilized by multiple types of software applications including BIOS 310, O/S 320, as well as various software applications that may be utilized by the data processing system. A password repository may be stored anywhere on the data processing system or in a location accessible by the system such as a server. A password repository may be stored in multiple locations such as with a collection of password repositories which may be treated a collective password repository.

Login monitor 340 may also utilize a username or userid repository 360 stored in memory. Username repository 360 may be stored in any data processing system memory similar to the password repositories shown in FIG. 1. A username repository may be created by a software application, such as an internet browser, or it may be system wide across multiple software applications. For example, a software application such as an internet browser may utilize a username repository for storing any username utilized by that internet browser. This could include usernames for various internet sites that a user may access using the internet browser. Username repository 360 may be managed by an operating system and utilized by multiple types of software applications including BIOS 310, O/S 320, as well as various software applications that may be utilized by the data processing system. A username repository may be stored anywhere on the data processing system or in a location accessible by the system such as a server. A username repository may be stored in multiple locations such as with a collection of username repositories which may be treated a collective username repository.

Figure 4:
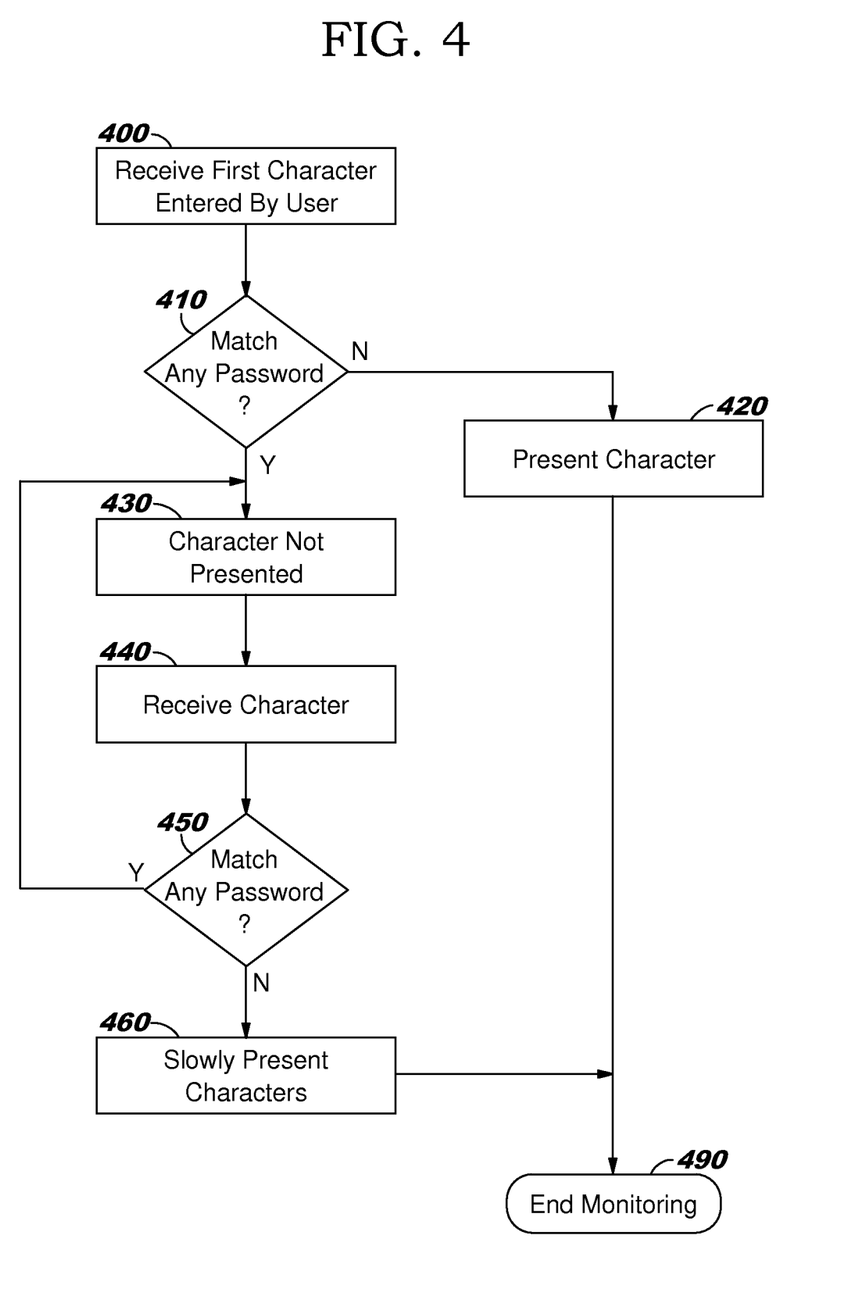
FIG. 4 depicts a flowchart of the operation of the login monitor in which a first embodiment may be implemented.

FIG. 4 depicts a flowchart of the operation of the login monitor in which a first embodiment may be implemented. In this embodiment, characters entered in the username field of a login page may not be displayed or otherwise presented if those characters match known passwords. Alternative embodiments may implement this process with data entry fields other than the username field. In an additional alternative embodiment, the password field may be excluded from the data entry fields implementing this first embodiment.

In step 400, the system detects that a user has typed or otherwise entered a character or character set in a username field such as for logging into a software application, webpage or other similar item. A character set may be one or multiple characters. This detection may be performed by the login monitor or it may be performed by another software application which calls or invokes the login monitor. The character set detected may be an alphabetic letter, a number, a special character, a combination thereof, or any other item which the user may enter into a username field.

In step 410, the login monitor determines whether the character set matches the first or leading character(s) of any password in a password repository such as is described with reference to FIG. 3 above. If the character set does not match the first or leading character(s) of any password in the password repository, then processing continues to step 420, otherwise processing continues to step 430 in case of a match.

In step 420, the character set that was typed or otherwise entered by the user is displayed or otherwise presented because it does not match the first or leading character(s) of any password. This allows a user to see what characters have been entered. Processing then continues to step 490 where processing login monitoring ends.

In case of a match in step 410, then in step 430 the character set entered by the user is not presented and processing continues to step 440. In an alternative embodiment, the first character entered by the user may be presented even though it matches the first character of a password in step 410. This is to allow the user to see that characters other than a username have been entered. In addition, it would make it more difficult for an unauthorized person to slowly enter various characters to find a password by watching to see what characters may not be presented. In another alternative embodiment, a random number of characters matching a password may be presented. This would also help prevent an unauthorized person from slowly entering various characters to find a password.

In step 440, a subsequent character or character set is received and combined or concatenated with the previous character set entered by the user into a new character set. The concatenated characters are then compared to the leading characters of the passwords in the password repository in step 450. If the concatenated string of characters matches the starting or leading characters of any password, including any whole password, then processing returns to step 430. However, if there is no match, then processing continues to step 460.

In step 460 of the first embodiment, the string of characters may then be presented slowly, one character at a time. This is to help make it appear that the reason the characters were not presented was due to a slow system. The first character may be presented quickly to minimize the time before any characters are presented. However, subsequent characters should be presented more slowly, preferably in a somewhat random internals of time. Processing them continues to step 490.

Figure 5:
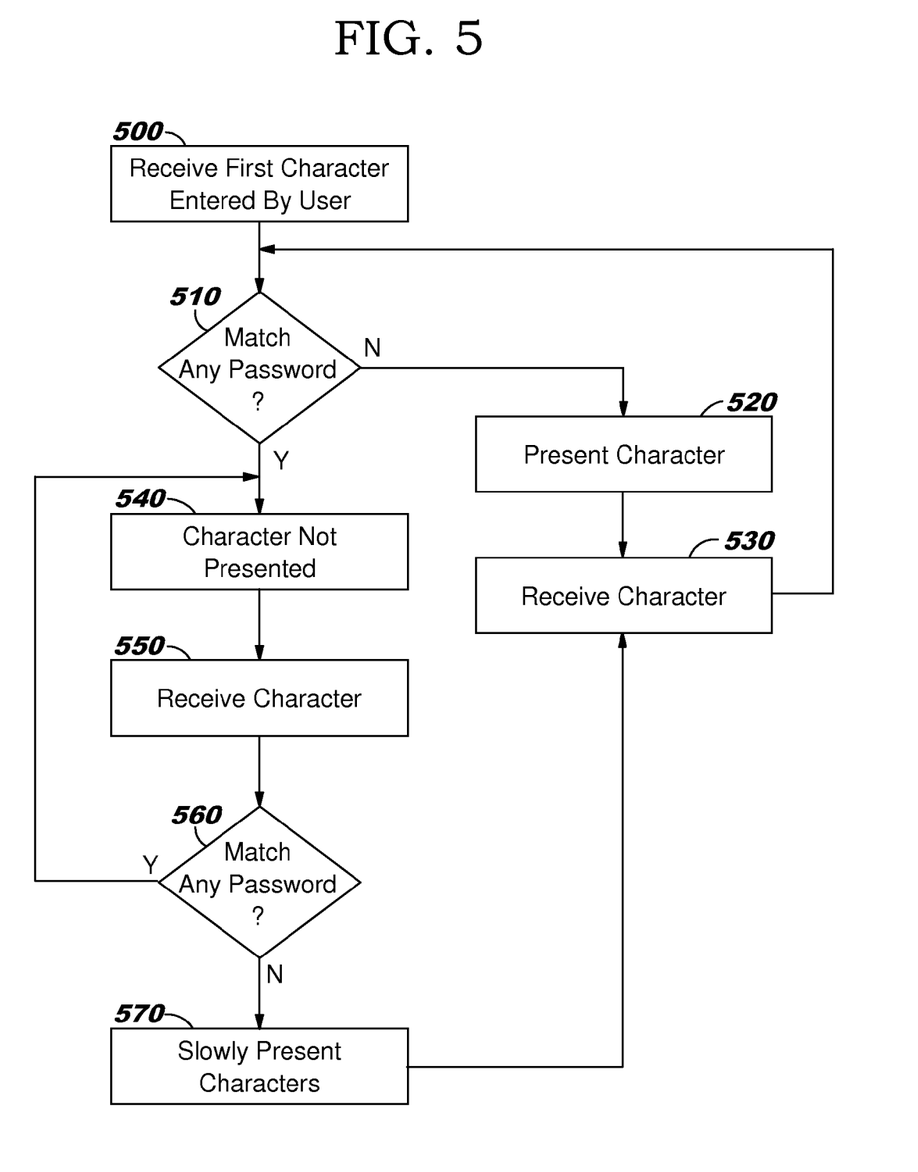
FIG. 5 depicts a flowchart of the operation of the login monitor in which a second embodiment may be implemented.

FIG. 5 depicts a flowchart of the operation of the login monitor in which a second embodiment may be implemented. In this embodiment, passwords may be hidden from view or otherwise not presented even if the user previously entered other characters in the username entry field. As with the first embodiment, alternative embodiments may implement this process with data entry fields other than the username field. In an additional alternative embodiment, the password field may be excluded from the data entry fields implementing this second embodiment.

In step 500, the system detects that a user has typed or otherwise entered a character or character set in a username field. A character set may be one or multiple characters. This detection may be performed by the login monitor or it may be performed by another software application which calls or invokes the login monitor. The character set detected may be an alphabetic letter, a number, a special character, a combination thereof, or any other item which the user may enter into a username field.

In step 510, the login monitor determines whether the character set matches the first or leading character(s) of any password in a password repository. As with the first embodiment, this password repository may be created by the software application, such as an internet browser, or it may be system wide across multiple software applications. If the character set does not match the first or leading character(s) of any password in the password repository, then processing continues to step 520, otherwise processing continues to step 540 in case of a match.

In step 520, the character set that was typed or otherwise entered by the user may be presented because it does not match the first or leading characters of any password. Processing then continues to step 530 where the next character set may be received. Once received, the processing returns to step 510 to determine whether that subsequent character set may match the first or leading characters of any password in the password repository.

In case of a match in step 510, then in step 540 the matching character set entered by the user may not be presented with processing continues to step 550. In an alternative embodiment, the first character entered by the user may be presented even though it matches the first character of a password in step 510. This is to allow the user to see that characters other than a username have been entered. In addition, it would make it more difficult for an unauthorized person to slowly enter various characters to find a password by watching to see what characters may not be presented. In another alternative embodiment, a random number of characters matching a password may be presented. This would also help prevent an unauthorized person from slowly entering various characters to find a password.

In step 550, a subsequent character set is then received and combined or concatenated with the previous character set entered by the user. The combined characters are then compared to passwords in the password repository in step 560. If the combined string of characters matches the starting characters of any password, including any whole password, then processing returns to step 540. However, if there is no match, then processing continues to step 570.

In step 570, the string of characters may then be presented slowly, one character at a time. As with the first embodiment, this is to help make it appear that the reason the characters were not presented was due to a slow system.

Figure 6:
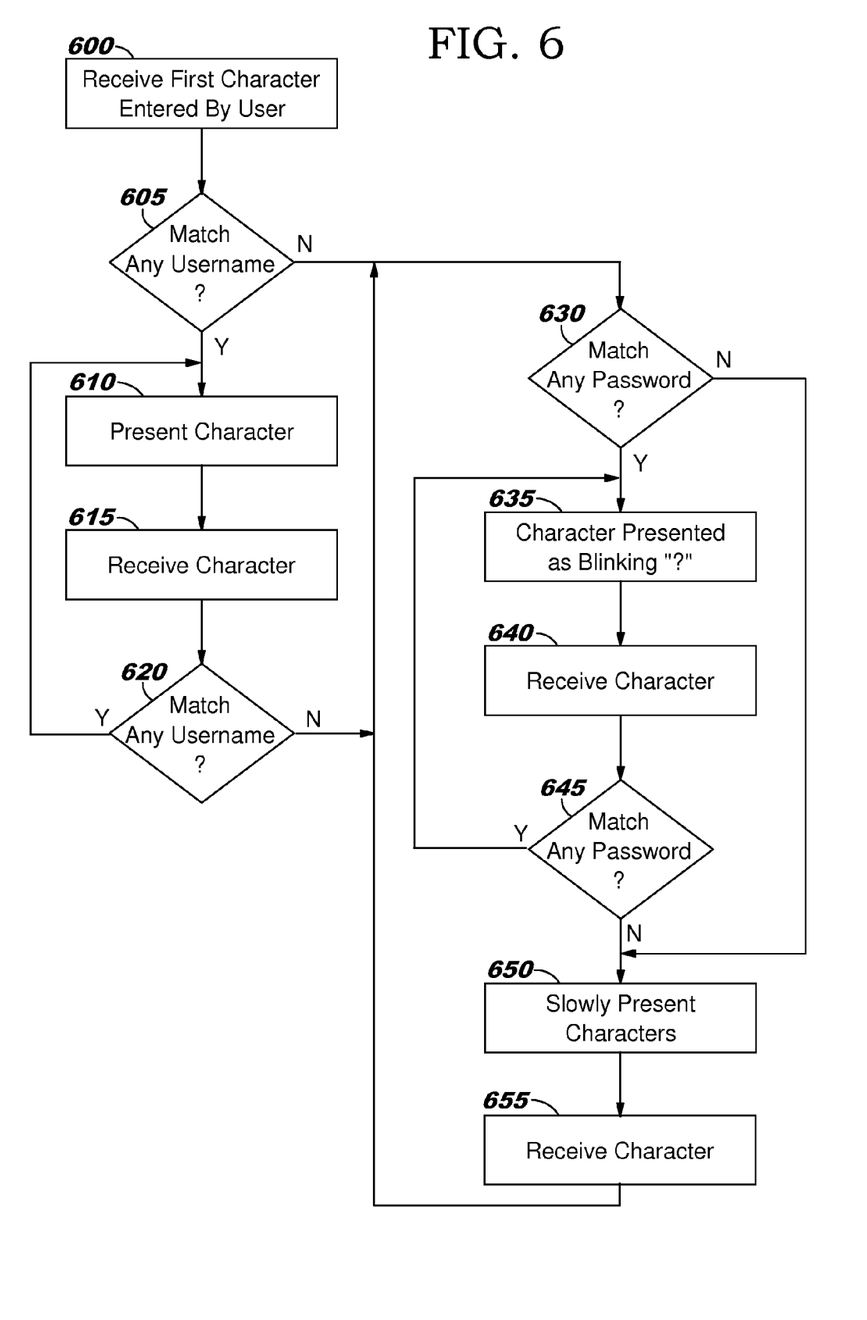
FIG. 6 depicts a flowchart of the operation of the login monitor in which a third embodiment may be implemented.

FIG. 6 depicts a flowchart of the operation of the login monitor in which a third embodiment may be implemented. In this embodiment, characters entered in the username field of a login page may not be displayed or otherwise presented if those characters match known passwords. Alternative embodiments may implement this process with data entry fields other than the username field. In an additional alternative embodiment, the password field may be excluded from the data entry fields implementing this third embodiment.

In step 600, the system detects that a user has typed or otherwise entered a character or character set in a username field such as for logging into a software application, webpage or other similar item. A character set may be one or multiple characters. This detection may be performed by the login monitor or it may be performed by another software application which calls or invokes the login monitor. The character set detected may be an alphabetic letter, a number, a special character, a combination thereof, or any other item which the user may enter into a username field.

In step 605, the login monitor determines whether the character set matches the first or leading character(s) of any username in a username repository such as is described with reference to FIG. 3 above. If the character set does not match the first or leading character(s) of any username in the username repository, then processing continues to step 630, otherwise processing continues to step 610 in case of a match.

In step 610, the character set that was typed or otherwise entered by the user is displayed or otherwise presented because it matches the first or leading character(s) of a username. This allows a user to see what characters have been entered. Processing then continues to step 615 for receiving another character. Once a character is received, then in step 620 the set of characters received so far are compared to the usernames in the username repository. If there is a match, then processing returns to step 610, otherwise processing continues to step 630.

In case of no match in step 605 or 620, then in step 630 the login monitor determines whether the character set (not including the characters matching a complete username name in previous steps) matches the first or leading character(s) of any password in a password repository such as is described with reference to FIG. 3 above. If the character set does not match the first or leading character(s) of any password in the username repository, then processing continues to step 650, otherwise processing continues to step 635 in case of a match.

In step 635, because the character set match at least a leading portion of a password, those characters may not be displayed. However, in this embodiment, a blinking question mark or other symbol may be displayed instead. In an alternative embodiment, a pop up box or other method may be used to query the user about the characters being entered such as "Are you sure you are entering the username?". In another alternative embodiment, the character set entered by the user may be presented even though it matches the leading character(s) of a password in step 630. This is to allow the user to see that characters other than a username have been entered. In addition, it would make it more difficult for an unauthorized person to slowly enter various characters to find a password by watching to see what characters may not be presented. In another alternative embodiment, a random number of characters matching a password may be presented. This would also help prevent an unauthorized person from slowly entering various characters to find a password.

In step 640, a subsequent character or character set is received and combined or concatenated with any previous character sets entered by the user into a new character set. This concatenation should not include any characters that matched a username in steps 605 or 620 above. The concatenated characters are then compared to the leading characters of the passwords in the password repository in step 645. If the concatenated string of characters matches the starting or leading characters of any password, including any whole password, then processing returns to step 635. However, if there is no match, then processing continues to step 650.

In step 650 of the third embodiment, the string of characters may then be presented slowly, one character at a time. This is to help make it appear that the reason the characters were not presented was due to a slow system. The first character may be presented quickly to minimize the time before any characters are presented. However, subsequent characters should be presented more slowly, preferably in a somewhat random internals of time. These characters may be blinking in an alternative embodiment. Processing them continues to step 655 for receiving the next character entered by the user in the data field. Once received, then processing returns to step 630.

Figure 7:
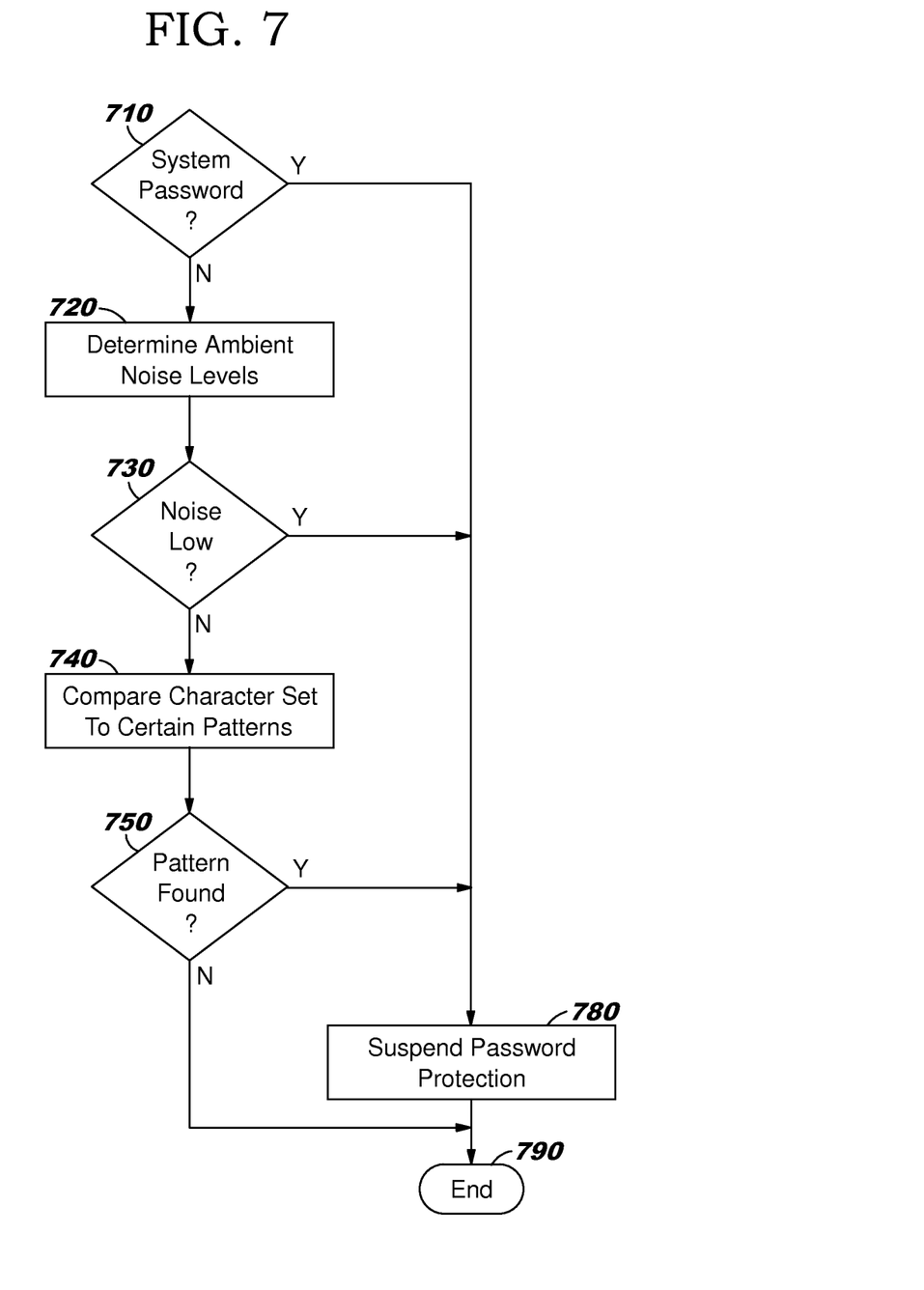
FIG. 7 depicts a flowchart of various password hacking prevention processes in which various embodiments may be implemented.

FIG. 7 depicts a flowchart of various password hacking prevention processes in which various embodiments may be implemented. An unauthorized user of a computer may attempt to use the above described embodiments to identify one or more passwords stored in a password repository. As a result, various techniques may be used to prevent such an occurrence.

In a first step 710, the system may determine whether the feature is being used in a username field or other data entry field associated with a system password. This could be an initial logon to the system or it could be when the system is being awoken up from a sleep mode. If that is the case, then processing continues to step 780 where the password protection feature is suspended, turned off, discontinued, or otherwise temporarily disabled. This suspension may continue until the condition causing the suspension has changed. For example, in the case of a system password being entered upon logon or after the system has been awoken from a sleep mode, the password protection feature may be turned on after the system password has been entered correctly. Processing then ends in step 790 until the user attempts to enter characters into another username or other data entry field.

If the user is not attempting to enter a system password, then processing continues to step 720. In step 720, the system determines whether the ambient noise levels around the user, then processing continues to step 730. If ambient noise levels are high, then there is a strong likelihood that the user is in an environment where other persons are nearby such that the password security feature is needed. In such an environment with other persons present, it is less likely that an unauthorized user may be trying to determine passwords stored in the password repository. If ambient noise levels are low, then there is a lower likelihood that other persons are nearby, thereby limiting the need for password protection features.

In step 730, if ambient noise levels are low or below a certain threshold, then processing continues to step 680 for disabling the password protection feature, otherwise processing continues to step 740. In step 780, the password protection feature may be suspended until the ambient noise has reduced to a certain threshold. The ambient noise threshold may be preset such as by a programmer of software implementing an embodiment. The ambient noise threshold may also be set by the user or an administrator of a network of systems implementing embodiments.

In step 740, the character set entered by the user in a username or other data entry field may be compared with certain patterns to help determine whether an unauthorized user may be attempting to identify passwords. Such patterns could be alphabetic (e.g. A B C D E or Q W E R T Y) or numeric (e.g. 1 2 3 4 5) or combinations thereof (e.g. A 1 B 2) or other patterns. In addition, if the user types a character set then backspaces and enters another character set repeatedly, then an unauthorized user may be using the system. Processing then continues to step 750 to determine whether a pattern has been found. If yes, then processing continues to step 780, otherwise to step 790. In this case, the password protection feature may be turned off until the system password has been correctly entered.

Other methods of determining whether an unauthorized user may be using the system may be implemented. In addition, other methods of determining whether other persons besides the user entering data are present may be implemented. If an unauthorized user is present or if no other person besides the person entering data is present, then the password protection feature may be disabled.

The invention can take the form of an entirely software embodiment, or an embodiment containing both hardware and software elements. In a preferred embodiment, the invention is implemented in software or program code, which includes but is not limited to firmware, resident software, and microcode.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), or Flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code such as the login monitor. A client data processing system may download that computer usable code, such as for storing on a data storage medium associated with the client data processing system, or for using in the client data processing system. The server data processing system may similarly upload computer usable code from the client data processing system such as a password repository. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of preventing a password from being presented in a data entry field on a computer display comprising:
    responsive to user entry of a character set in the data entry field, comparing the character set to a securely stored password set for a potential match of the character set with leading characters of a password in the password set;
    responsive to detecting a match, inhibiting presentation of at least one character of the character set in the data entry field; and
    responsive to detecting a lack of a match, presenting the character set in the data entry field.

2. The method of claim 1 wherein the data entry field is a username field.

3. The method of claim 1 wherein presenting the character set is performed one character at a time with time intervals between characters discernable by a user.

4. The method of claim 1 wherein trailing characters of the character set are compared to leading characters of each password in the password set.

5. The method of claim 1 further comprising presenting the character set if ambient noise near the computer display is below a threshold level.

6. The method of claim 1 further comprising presenting the character set if certain patterns are detected in the character set.

7. The method of claim 1 further comprising comparing the character set to at least one username stored in a username repository and presenting the character set if a match is found.

8. The method of claim 1 wherein the data entry field is a username field, all characters of the character set are presented one character at a time upon detection of a match, and presenting the character set if ambient noise near the computer display is below a threshold level.

9. A computer usable program product comprising a computer usable non-transitory storage medium including computer usable code for use in preventing a password from being presented in a data entry field on a computer display, the computer usable program product comprising code for performing the steps of:
    responsive to user entry of a character set in the data entry field, comparing the character set to a securely stored password set for a potential match of the character set with leading characters of a password in the password set;
    responsive to detecting a match, inhibiting presentation of at least one character of the character set in the data entry field; and
    responsive to detecting a lack of a match, presenting the character set in the data entry field.

10. The computer usable program product of claim 9 wherein the data entry field is a username field.

11. The computer usable program product of claim 9 wherein presenting the character set is performed one character at a time with time intervals between characters discernable by a user.

12. The computer usable program product of claim 9 wherein trailing characters of the character set are compared to leading characters of each password in the password set.

13. The computer usable program product of claim 9 further comprising presenting the character set if ambient noise near the computer display is below a threshold level.

14. The computer usable program product of claim 9 further comprising presenting the character set if certain patterns are detected in the character set.

15. A data processing system for preventing a password from being presented in a data entry field on a computer display, the data processing system comprising:
    a processor; and
    a memory storing program instructions which when executed by the processor execute the steps of:
    responsive to user entry of a character set in the data entry field, comparing the character set to a securely stored password set for a potential match of the character set with leading characters of a password in the password set;

responsive to detecting a match, inhibiting presentation of at least one character of the character set in the data entry field; and responsive to detecting a lack of a match, presenting the character set in the data entry field.

16. The data processing system of claim 15 wherein the data entry field is a username field.

17. The data processing system of claim 15 wherein presenting presents the character set one character at a time with time intervals between characters discernable by a user.

18. The data processing system of claim 15 wherein comparing compares trailing characters of the character set to leading characters of each password in the password set.

19. The data processing system of claim 15 further comprising presenting the character set if ambient noise near the computer display is below a threshold level.

20. The data processing system of claim 15 further comprising presenting the character set if certain patterns are detected in the character set.

\* \* \* \* \*